(12) United States Patent
Shu et al.

(10) Patent No.: US 10,306,624 B2
(45) Date of Patent: May 28, 2019

(54) METHOD FOR NOTIFYING CHANNEL USE TIME FOR SENDING UPLINK DATA, AND METHOD AND DEVICE FOR SENDING UPLINK DATA

(71) Applicant: Huawei Device Co., Ltd., Dongguan (CN)

(72) Inventors: Guiming Shu, Shenzhen (CN); Young Hoon Kwon, San Diego, CA (US)

(73) Assignee: HUAWEI DEVICE CO., LTD., Dongguan (CN)

( * ) Notice: Subject to any disclaimer, the term of this patent is extended or adjusted under 35 U.S.C. 154(b) by 415 days.

(21) Appl. No.: 13/923,142

(22) Filed: Jun. 20, 2013

(65) Prior Publication Data
US 2014/0003314 A1 Jan. 2, 2014

(30) Foreign Application Priority Data
Jun. 20, 2012 (CN) .......................... 2012 1 0205425

(51) Int. Cl.
*H04W 72/04* (2009.01)
*H04W 52/02* (2009.01)
*H04W 72/12* (2009.01)

(52) U.S. Cl.
CPC ... *H04W 72/0446* (2013.01); *H04W 52/0212* (2013.01); *H04W 72/12* (2013.01);
(Continued)

(58) Field of Classification Search
None
See application file for complete search history.

(56) References Cited

U.S. PATENT DOCUMENTS 8,717,956 B2* 5/2014 Lee et al. .................. 370/311
2005/0003794 A1* 1/2005 Liu .................. H04W 52/0216
455/355

(Continued)

FOREIGN PATENT DOCUMENTS

CN 101203020 A 6/2008
CN 102301807 A 12/2011
(Continued)

OTHER PUBLICATIONS

International Search Report and Written Opinion received in Application No. PCT/CN2013/077544, dated Aug. 29, 2013, 12 pages.

(Continued)

*Primary Examiner* — Brandon M Renner
*Assistant Examiner* — Manuel Rangel
(74) *Attorney, Agent, or Firm* — Slater Matsil, LLP

(57) ABSTRACT

A method of an access point device is disclosed. A first indication message is sent to a terminal. The first indication message is used to indicate that the terminal is allowed to access a current channel or to indicate that the terminal has downlink data on the access point device or to indicate that the terminal is allowed to send uplink data. A second indication message is sent by the terminal according to the first indication message. The second indication message is used to indicate that the terminal is to send uplink data. After receiving the second indication message, a third indication message is sent to the terminal. The third indication message carries channel use time information. The channel use time information is used to indicate time for using the channel to send the uplink data by the terminal.

22 Claims, 6 Drawing Sheets

(52) U.S. Cl.
    CPC ......... *H04W 52/0216* (2013.01); *Y02D 70/00* (2018.01); *Y02D 70/1224* (2018.01); *Y02D 70/1262* (2018.01); *Y02D 70/142* (2018.01); *Y02D 70/146* (2018.01)

(56) References Cited

U.S. PATENT DOCUMENTS

| | | | |
|---|---|---|---|
| 2007/0115972 A1* | 5/2007 | Jang | H04L 1/0007 370/389 |
| 2007/0281617 A1* | 12/2007 | Meylan et al. | 455/41.2 |
| 2009/0252110 A1 | 10/2009 | Sridhara et al. | |
| 2009/0310618 A1* | 12/2009 | Carter | H04L 12/12 370/449 |
| 2010/0046457 A1 | 2/2010 | Abraham et al. | |
| 2010/0279695 A1* | 11/2010 | Amirijoo | H04W 36/0055 455/438 |
| 2011/0317609 A1* | 12/2011 | Sammour | H04L 1/1614 370/312 |
| 2012/0231828 A1* | 9/2012 | Wang | H04W 74/04 455/509 |
| 2013/0070642 A1* | 3/2013 | Kim et al. | 370/254 |
| 2013/0077554 A1* | 3/2013 | Gauvreau | H04L 5/001 370/312 |
| 2013/0128798 A1* | 5/2013 | Liu | 370/312 |
| 2013/0141215 A1* | 6/2013 | Merlin | H04W 52/0209 340/7.34 |
| 2013/0229959 A1* | 9/2013 | Ghosh | H04W 74/08 370/311 |
| 2013/0235773 A1* | 9/2013 | Wang | H04W 52/0206 370/311 |
| 2013/0294427 A1* | 11/2013 | Kim | H04W 16/14 370/338 |
| 2014/0335871 A1* | 11/2014 | Doppler | H04W 16/02 455/448 |

FOREIGN PATENT DOCUMENTS

| | | |
|---|---|---|
| CN | 102386954 A | 3/2012 |
| EP | 1816883 A1 | 8/2007 |
| KR | 100643477 B1 | 10/2006 |
| KR | 20110076885 A | 7/2011 |
| WO | 2009035301 A2 | 3/2009 |
| WO | 2009116939 A2 | 9/2009 |
| WO | 2011038154 A1 | 3/2011 |

OTHER PUBLICATIONS

Park, M., "Proposed Specification Framework for TGah," IEEE P802.11, Wireless LANs, May 17, 2012, 20 pages.

* cited by examiner

METHOD FOR NOTIFYING CHANNEL USE TIME FOR SENDING UPLINK DATA, AND METHOD AND DEVICE FOR SENDING UPLINK DATA

CROSS-REFERENCE TO RELATED APPLICATIONS

This application claims priority to Chinese Patent Application No. 201210205425.7, filed on Jun. 20, 2012, which is hereby incorporated by reference in its entirety.

TECHNICAL FIELD

The present invention relates to communication technologies, and in particular, to a method for notifying channel use time for sending uplink data, and a method and device for sending uplink data.

BACKGROUND

In the prior art, an access point (Access Point, AP) sends indication information to a station (Station, STA), to indicate start time and end time for sending uplink data by each STA, and the STA enters an active state at specified time according to the time indicated by the AP and sends uplink data to the AP.

However, due to an impact of a nearby interference signal transmitted on a same frequency band on which the indication information is transmitted, the STA may fail to receive the indication information sent by the AP, and cannot send uplink data at the uplink data sending time specified by the AP, thereby causing a waste of the uplink data sending time allocated by the AP.

SUMMARY

Embodiments of the present invention provide a method for notifying channel use time for sending uplink data, and a method and device for sending uplink data, so as to improve utilization of uplink data sending time allocated by a network side.

In one aspect, an embodiment of the present invention provides a method for notifying channel use time for sending uplink data, where the method includes:

sending, by an access point device, a first indication message to a terminal, where the first indication message is used to indicate that the terminal is allowed to access a current channel, or the first indication message is used to indicate that the terminal has downlink data on the access point device, or the first indication message is used to indicate that the terminal is allowed to send uplink data;

receiving, by the access point device, a second indication message sent by the terminal according to the first indication message, where the second indication message is used to indicate that the terminal is to send uplink data; and after receiving the second indication message, sending, by the access point device, a third indication message to the terminal, where the third indication message carries channel use time information, and the channel use time information is used to indicate time for using the channel to send the uplink data by the terminal.

In the method as described above, the second indication message carries a data amount of the uplink data of the terminal or information of time for sending the uplink data of the terminal.

In the method as described above, before the access point device sends the third indication message to the terminal after receiving the second indication message, the method further includes: determining, by the access point device, the channel use time information according to the data amount of the uplink data or the information of time for sending the uplink data, where the data amount of the uplink data or the information of time for sending the uplink data is carried in the second indication message.

In the method as described above, the sending, by the access point device, the third indication message to the terminal includes: sending, by the access point device, a broadcast message to the terminal, where the broadcast message carries the channel use time information; or sending, by the access point device, a first acknowledgment message for the second indication message to the terminal, where the first acknowledgment message carries the channel use time information.

In the method as described above, after the access point device receives the second indication message sent by the terminal according to the first indication message, the method further includes: sending, by the access point device, a second acknowledgment message for the second indication message to the terminal, where the second acknowledgment message is used to indicate that the access point device has received the second indication message.

In the method as described above, the first indication message further carries: information of time for sending the second indication message, where the information of time for sending the second indication message is used to indicate time for sending the second indication message by the terminal.

In the method as described above, the first indication message further carries: information of time for sending the third indication message by the access point device to the terminal, so that the terminal enters a doze state after sending the second indication message to the access point device and enters an awake state from the doze state before receiving the third indication message sent by the access point device.

An embodiment of the present invention provides a method for sending uplink data, where the method includes:

receiving, by a terminal, a first indication message sent by an access point device, where the first indication message is used to indicate that the terminal is allowed to access a current channel, or the first indication message is used to indicate that the terminal has downlink data on the access point device, or the first indication message is used to indicate that the terminal is allowed to send uplink data;

sending, by the terminal, a second indication message to the access point device according to the first indication message, where the second indication message is used to indicate that the terminal is to send uplink data;

receiving, by the terminal, a third indication message sent by the access point device after the access point device receives the second indication message, where the third indication message carries channel use time information, and the channel use time information is used to indicate time for using the channel to send the uplink data by the terminal; and sending, by the terminal, the uplink data to the access point device at the time for using the channel according to the channel use time information.

In the method as described above, before the terminal sends the second indication message to the access point device according to the first indication message, the method further includes: determining, by the terminal, a data amount of the uplink data or information of time for sending the uplink data; where the second indication message sent by the terminal to the access point device carries the data amount of the uplink data or the information of time for sending the uplink data, so that the access point device determines the channel use time information according to the data amount of the uplink data or the information of time for sending the uplink data.

In the method as described above, the third indication message is specifically a broadcast message sent by the access point device, where the broadcast message carries the channel use time information, and the receiving, by the terminal, the third indication message sent by the access point device includes: receiving, by the terminal, the broadcast message sent by the access point device; or the third indication message is specifically a first acknowledgment message sent by the access point device for the second indication message, where the first acknowledgment message carries the channel use time information; and the receiving, by the terminal, the third indication message sent by the access point device includes: receiving, by the terminal, the first acknowledgment message sent by the access point device.

In the method as described above, after the terminal sends the second indication message to the access point device according to the first indication message, the method further includes: receiving, by the terminal, a second acknowledgment message sent by the access point device for the second indication message, where the second acknowledgment message is used to indicate that the access point device has received the second indication message.

In the method as described above, the first indication message further carries: information of time for sending the second indication message, where the information of time for sending the second indication message is used to indicate time for sending the second indication message by the terminal; and the sending, by the terminal, the second indication message to the access point device according to the first indication message specifically includes: sending, by the terminal, the second indication message to the access point device according to the information of time for sending the second indication message, where the information of time for sending the second indication message is carried in the first indication message.

In the method as described above, the first indication message further carries: information of time for sending the third indication message by the access point device to the terminal; after the terminal sends the second indication message to the access point device according to the first indication message, the method further includes: entering, by the terminal, a doze state; and before the terminal receives the third indication message sent by the access point device after the access point device receives the second indication message, the method further includes: entering, by the terminal, an awake state from the doze state.

In another aspect, an embodiment of the present invention provides an access point device, including:
a transmitter, configured to send a first indication message to a terminal, where the first indication message is used to indicate that the terminal is allowed to access a current channel, or the first indication message is used to indicate that the terminal has downlink data on the access point device, or the first indication message is used to indicate that the terminal is allowed to send uplink data; and
a receiver, configured to receive a second indication message sent by the terminal according to the first indication message, where the second indication message is used to indicate that the terminal is to send uplink data;
where the transmitter is further configured to send a third indication message to the terminal after the receiver receives the second indication message, where the third indication message carries channel use time information, and the channel use time information is used to indicate time for using the channel to send the uplink data by the terminal.

In the access point device as described above, the second indication message received by the receiver carries a data amount of the uplink data of the terminal or information of time for sending the uplink data of the terminal.

In the access point device as described above, the access point device further includes: a processor, configured to determine the channel use time information according to the data amount of the uplink data or the information of time for sending the uplink data, where the data amount of the uplink data or the information of time for sending the uplink data is carried in the second indication message.

In the access point device as described above, the transmitter is specifically configured to: send a broadcast message to the terminal, where the broadcast message carries the channel use time information; or send a first acknowledgment message for the second indication message to the terminal, where the first acknowledgment message carries the channel use time information.

In the access point device as described above, the transmitter is further configured to: send a second acknowledgment message for the second indication message to the terminal after the receiver receives the second indication message sent by the terminal, where the second acknowledgment message is used to indicate that the access point device has received the second indication message.

In the access point device as described above, the first indication message sent by the transmitter further carries: information of time for sending the second indication message, where the information of time for sending the second indication message is used to indicate time for sending the second indication message by the terminal.

In the access point device as described above, the first indication message sent by the transmitter further carries: information of time for sending the third indication message by the transmitter to the terminal, so that the terminal enters a doze state after sending the second indication message to the access point device, and enters an awake state from the doze state before receiving the third indication message sent by the transmitter.

An embodiment of the present invention provides a terminal, including:
a receiver, configured to receive a first indication message sent by an access point device, where the first indication message is used to indicate that the terminal is allowed to access a current channel, or the first indication message is used to indicate that the terminal has downlink data on the access point device, or the first indication message is used to indicate that the terminal is allowed to send uplink data; and
a transmitter, configured to send a second indication message to the access point device according to the first indication message, where the second indication message is used to indicate that the terminal is to send uplink data;
where the receiver is further configured to receive a third indication message sent by the access point device after the access point device receives the second indication message, where the third indication message carries channel use time information, and the channel use time information is used to indicate time for using the channel to send the uplink data by the terminal; and the transmitter is further configured to send the uplink data to the access point device at the time for using the channel according to the channel use time information.

The terminal as described above further includes: a processor, configured to determine a data amount of the uplink data or information of time for sending the uplink data; and the second indication message sent by the transmitter to the access point device carries the data amount of the uplink data or the information of time for sending the uplink data, so that the access point device determines the channel use time information according to the data amount of the uplink data or the information of time for sending the uplink data.

In the terminal as described above, the third indication message is specifically a broadcast message sent by the access point device, where the broadcast message carries the channel use time information; and the receiver is specifically configured to receive the broadcast message sent by the access point device; or the third indication message is specifically a first acknowledgment message sent by the access point device for the second indication message, where the first acknowledgment message carries the channel use time information; and the receiver is specifically configured to receive the first acknowledgment message sent by the access point device.

In the terminal as described above, the receiver is further configured to: receive a second acknowledgment message sent by the access point device for the second indication message, where the second acknowledgment message is used to indicate that the access point device has received the second indication message.

In the terminal as described above, the first indication message received by the receiver further carries: information of time for sending the second indication message, where the information of time for sending the second indication message is used to indicate time for sending the second indication message by the terminal; and the transmitter is specifically configured to send the second indication message to the access point device according to the information of time for sending the second indication message, where the information of time for sending the second indication message is carried in the first indication message.

In the terminal as described above, the first indication message further carries information of time for sending the third indication message by the access point device to the terminal; the processor is further configured to control the terminal to enter a doze state after the transmitter sends the second indication message to the access point device; and the processor is further configured to control the terminal to enter an awake state from the doze state before the receiver receives the third indication message.

In the method for notifying channel use time for sending uplink data and the method and device for sending uplink data are provided by the embodiments of the present invention, after an access point device sends, to a terminal, an indication message that is used to indicate that the terminal is allowed to send uplink data, if the access point device receives an indication message which is sent by the terminal according to the indication message for sending uplink data and is used to indicate that uplink data is to be sent, the access point device sends, to the terminal, channel use time information for sending the uplink data, so as to improve utilization of uplink data sending time allocated by the access point device.

BRIEF DESCRIPTION OF DRAWINGS

To describe the technical solutions in the embodiments of the present invention or in the prior art more clearly, the following briefly describes accompanying drawings required for describing the embodiments. Apparently, the accompanying drawings in the following description show some embodiments of the present invention, and persons of ordinary skill in the art may further obtain other drawings according to these accompanying drawings without creative efforts.

DESCRIPTION OF EMBODIMENTS

Figure 1:
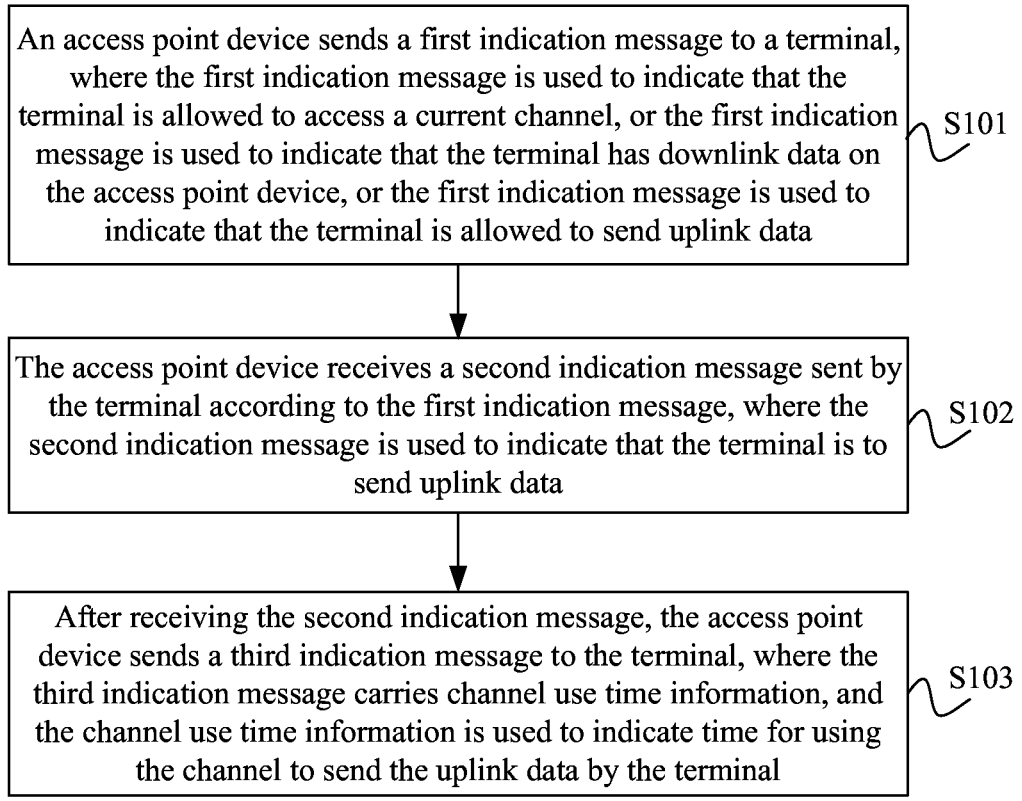
FIG. 1 is a flowchart of an embodiment of a method for notifying channel use time for sending uplink data according to the present invention.

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the embodiments to be described are merely part rather than all of the embodiments of the present invention. All other embodiments obtained by persons of ordinary skill in the art based on the embodiments of the present invention without creative efforts shall fall within the protection scope of the present invention.

The technology described in this document may be used in various communication systems, for example, current 2G and 3 G communication systems and a next-generation communication system, for example, a global system for mobile communications (GSM, Global System for Mobile communications), a code division multiple access (CDMA, Code Division Multiple Access) system, a time division multiple access (TDMA, Time Division Multiple Access) system, a wideband code division multiple access (WCDMA, Wideband Code Division Multiple Access) system, a frequency division multiple access (FDMA, Frequency Division Multiple Access) system, an orthogonal frequency division multiple access (OFDMA, Orthogonal Frequency Division Multiple Access) system, a single-carrier FDMA (SC-FDMA) system, a general packet radio service (GPRS, General Packet Radio Service) system, a long term evolution (LTE, Long Term Evolution) system, and other communication systems of this type.

The terminal involved in this application may be a wireless terminal, and may also be a wired terminal, where the wireless terminal may be a device providing voice and/or data connectivity for a user, a handheld device having a wireless connection function, or another processing device connected to a wireless modem. The wireless terminal may communicate with one or multiple core networks through a radio access network (for example, RAN, Radio Access Network). The wireless terminal may be a mobile terminal, for example, a mobile phone (or referred to as "cellular" phone) and a computer with a mobile terminal, such as a portable mobile apparatus, a pocket mobile apparatus, a handheld mobile apparatus, a mobile apparatus built in a computer, or a vehicle-mounted mobile apparatus. The mobile apparatuses exchange voice and/or data with the radio access network, and for example, may be devices such as a personal communication service (PCS, Personal Communication Service) phone, a cordless phone, a session initiation protocol (SIP) phone, a wireless local loop (WLL, Wireless Local Loop) station, and a personal digital assistant (PDA, Personal Digital Assistant). The wireless terminal may also be referred to as a subscriber unit (Subscriber Unit), a subscriber station (Subscriber Station), a mobile station (Mobile Station), a mobile station (Mobile STA), a STA, a remote station (Remote Station), an access point (Access Point), a remote terminal (Remote Terminal), an access terminal (Access Terminal), a user terminal (User Terminal), a user agent (User Agent), a user device (User Device), or a user equipment (User Equipment).

An access point device involved in this application may be an access point (Access Point, AP) in a WLAN, may also be a base station (Base Transceiver Station, BTS) in a GSM network, a GPRS network or a CDMA network, may also be a base station (NodeB) in a CDMA2000 network or a WCDMA network, may also be an evolved base station (Evolved NodeB, eNB) in an LTE network, may also be an access service network base station (Access Service Network Base Station, ASN BS) in a WiMAX network, and may also be another network element; or may also be a network element such as a controller or an authenticator behind the foregoing access point or base station.

FIG. 1 is a flowchart of an embodiment of a method for notifying channel use time for sending uplink data according to the present invention. As shown in FIG. 1, the method includes:

S101: An access point device sends a first indication message to a terminal, where the first indication message is used to indicate that the terminal is allowed to access a current channel, or the first indication message is used to indicate that the terminal has downlink data on the access point, or the first indication message is used to indicate that the terminal is allowed to send uplink data.

S102: The access point device receives a second indication message sent by the terminal according to the first indication message, where the second indication message is used to indicate that the terminal is to send uplink data.

S103: After receiving the second indication message, the access point device sends a third indication message to the terminal, where the third indication message carries channel use time information, and the channel use time information is used to indicate time for using the channel to send the uplink data by the terminal.

The access point device may send the first indication message to one or more terminals. Alternatively, the access point device may send the first indication message to the terminal in a unicast or broadcast manner.

The first indication message may be used to indicate that the terminal is allowed to access the current channel, where the current channel is a current working channel of the access point device. In an embodiment of the present invention, the allowing the terminal to access the current channel specifically refers to that within a subsequent period of time after the access point device sends the first indication message, for example, within a current beacon interval, the terminal may communicate with the access point device by using the current working channel of the access point device, for example, the terminal may receive a downlink management frame, control frame, or data frame sent by the access point device, and the terminal may send an uplink management frame, control frame, or data frame to the access point device.

Or, the first indication message may also be used to indicate that the terminal has downlink data on the access point, that is, the access point device has downlink data that needs to be sent to the terminal. In an embodiment of the present invention, when the terminal receives the first indication message and finds that the terminal itself has downlink data on the access point device, the terminal may also indicate, in the indication message which is sent to the access point device and indicates that the terminal is prepared for receiving the downlink data, that there is uplink data to be sent and data amount information of the uplink data or sending time information required for sending the uplink data. In this case, the indication message which is sent by the terminal to the access point device and indicates that the terminal is prepared for receiving the downlink data is the second indication message.

Or, the first indication message may further be used to indicate that the terminal is allowed to send uplink data to the access point device.

Due to an impact of a factor such as a nearby co-channel interference signal, a terminal or some terminals may fail to receive the first indication message sent by the access point device. Or, a terminal or some terminals do not need to send uplink data. Therefore, the terminals do not send the second indication message to the access point device. However, except the terminal that fails to receive the first indication message or does not need to send uplink data, another terminal receiving the first indication message may send the second indication message to the access point device according to the first indication message. It can be seen that the number of terminals sending the second indication message may be smaller than the number of terminals receiving the first indication message, and may also be equal to the number of terminals receiving the first indication message.

In one feasible implementation manner, after receiving the second indication message sent by the terminal according to the first indication message, the access point device may determine, according to factors such as the number of terminals that need to send uplink data and a channel resource that can bear the uplink data, channel use time for sending the uplink data for each terminal.

In another feasible implementation manner, the second indication message sent by the terminal to the access point device may carry a data amount of the uplink data of the terminal or information of time for sending the uplink data of the terminal. In one implementation scenario, after receiving the second indication message carrying the data amount of the uplink data, the access point device may determine, according to the data amount of the uplink data and a rate of sending the uplink data by the terminal, channel use time for sending the uplink data for a corresponding terminal; in another implementation scenario, after receiving the second indication message carrying the information of time for sending the uplink data, the access point device may determine, according to the information of time for sending the uplink data, channel use time information for sending the uplink data for the terminal.

The third indication message sent by the access point device to the terminal may be sent in a broadcast manner, and may also be sent in a unicast manner.

In one feasible implementation manner, the third indication message sent by the access point device to the terminal may be a broadcast message, where the broadcast message carries channel use time information for sending uplink data by each terminal.

Alternatively, the broadcast message may directly carry an identifier of each terminal and channel use time information for sending uplink data by the terminal; or the broadcast message may further indicate, in a implicit manner, channel use time information for sending uplink data by each terminal. For example, the broadcast message may carry information formed by multiple binary bits, where each binary bit may be used to indicate a terminal, for example, a first binary bit may be used to indicate a terminal 1, a second binary bit may be used to indicate a terminal 2, . . . , and an $n^{th}$ binary bit may be used to indicate a terminal n. The access point device and the terminal may agree by default that a binary bit set to "1" in the broadcast message indicates that channel use time is allocated to a corresponding terminal, and that a binary bit set to "0" indicates that channel use time is not allocated to a corresponding terminal, and after an information field formed by the foregoing multiple binary bits, channel use time for sending uplink data is indicated in sequence for a corresponding terminal according to a sequence of a terminal corresponding to a binary bit set to "1". In addition, the access point device and the terminal may also agree on a time unit of certain time. For any terminal that receives a broadcast message, if the terminal corresponds to a fifth (assuming the number of terminals is counted from 0) binary bit set to "1", the terminal device may determine information carried within the time unit starting from a time point after a delay of an agreed time unit multiplied by 5, timing immediately from a broadcast frame, as the channel use time information for sending uplink data for the terminal.

It is understandable that the foregoing is only several feasible implementation manners in which the broadcast message carries channel use time information for sending uplink data by each terminal, to which the present invention is not limited.

Alternatively, after receiving the second indication message sent by any terminal, the access point device may further send a second acknowledgment message for the second indication message to the terminal, where the second acknowledgment message may be used to indicate that the access point device has received the second indication message successfully.

In another feasible implementation manner, after receiving the second indication message sent by any terminal, the access point device may further send a first acknowledgment message for the second indication message to the terminal, where the first acknowledgment message may be used to indicate that the access point device has received the second indication message. The first acknowledgment message may be used as a third indication message, and may carry channel use time information for sending uplink data by the terminal.

Usually each terminal sends the second indication message to the access point device in a contention manner, but the manner may cause a terminal or some terminals to fail to send the second indication message to the access point device. Therefore, alternatively, the first indication message sent by the access point device to the terminal may further carry: information of time for sending the second indication message, where the information of time for sending the second indication message is used to indicate time for sending the second indication message by the terminal.

Alternatively, to reduce power consumption of the terminal, the first indication message sent by the access point device to the terminal may further carry: information of time for sending the third indication message by the access point device to the terminal, so that the terminal may enter a doze (doze) state after sending the second indication message to the access point device, and enter an awake (awake) state from the doze state before receiving the third indication message sent by the access point device.

In the method for notifying channel use time for sending uplink data according to this embodiment, after an access point device sends, to a terminal, an indication message that is used to indicate that the terminal is allowed to send uplink data, if the access point device receives an indication message which is sent by the terminal according to the indication message for sending uplink data and is used to indicate that uplink data is to be sent, the access point device sends, to the terminal, channel use time information for sending the uplink data, so as to improve channel utilization of uplink data sending time allocated by the access point device.

Figure 2:
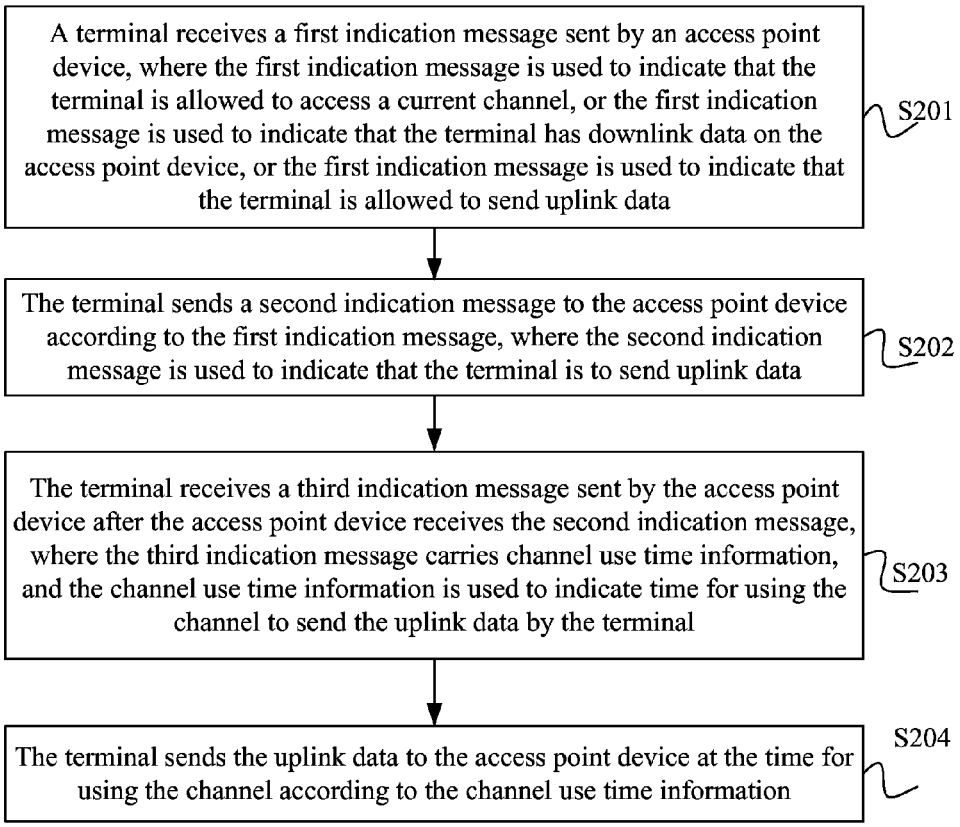
FIG. 2 is a flowchart of another embodiment of a method for sending uplink data according to the present invention.

FIG. 2 is a flowchart of another embodiment of a method for sending uplink data according to the present invention. As shown in FIG. 2, the method includes:

S201: A terminal receives a first indication message sent by an access point device, where the first indication message is used to indicate that the terminal is allowed to access a current channel, or the first indication message is used to indicate that the terminal has downlink data on the access point device, or the first indication message is used to indicate that the terminal is allowed to send uplink data.

S202: The terminal sends a second indication message to the access point device according to the first indication message, where the second indication message is used to indicate that the terminal is to send uplink data.

It should be noted that if the terminal receives the first indication message and finds that the terminal itself has downlink data on the access point device, the terminal may also indicate, in the indication message which is sent to the access point device and indicates that the terminal is prepared for receiving the downlink data, that there is uplink data to be sent and data amount information of the uplink data or sending time information required for sending the uplink data. In this case, the indication message which is sent by the terminal to the access point device and indicates that the terminal is prepared for receiving the downlink data is the second indication message.

S203: The terminal receives a third indication message sent by the access point device after the access point device receives the second indication message, where the third indication message carries channel use time information, and the channel use time information is used to indicate time for using the channel to send the uplink data by the terminal.

S204: The terminal sends the uplink data to the access point device at the time for using the channel according to the channel use time information.

After any terminal receives the first indication message sent by the access point device, if the terminal needs to send uplink data, the terminal may send, to the access point device, a second indication message, which is used to indicate that uplink data is to be sent.

In one feasible implementation manner, in order to make the access point device to reasonably allocate channel use time for sending the uplink data to the terminal, the terminal may first determine a data amount of the uplink data that needs to be sent, so that the access point device can determine, according to the data amount and a sending rate of the terminal, time for using the channel to send the uplink data by the terminal.

In another feasible implementation manner, the terminal may also determine, according to the data amount of the uplink data that needs to be sent and its own sending rate, sending time required for sending the uplink data. The terminal may carry the information of time for sending the uplink data in the second indication message sent to the access point device, so that the access point device determines, according to the information of time for sending the uplink data, where the information of time for sending the uplink data is carried in the second indication message, time for using the channel to send the uplink data by the terminal.

The third indication message received by the terminal may be a broadcast message sent by the access point device, where the broadcast message carries channel use time information for sending the uplink data by the terminal; or the third indication message may also be a first acknowledgment message sent by the access point device for the second indication message to the terminal, where the first acknowledgment message may carry channel use time information for sending the uplink data by the terminal. For a specific implementation manner in which the broadcast message carries channel use time information, reference may be made to the related description in the embodiment shown in FIG. 1, and details are not repeatedly described here.

Alternatively, after sending the second indication message to the access point device, the terminal may further receive a second acknowledgment message sent by the access point device for the second indication message, where the second acknowledgment message may be used to indicate that the access point device has received the second indication message.

To avoid sending failure of a terminal or some terminals because each terminal uses a contention mechanism to send the second indication message to the access point device, the first indication message which is received by the terminal and is sent by the access point device may further carry: information of time for sending the second indication message, where the information of time for sending the second indication message is used to indicate time for sending the second indication message by the terminal. Correspondingly, the terminal may send a second indication message to the access point device according to the information of time for sending the second indication message.

Alternatively, in order to reduce power consumption of the terminal, the first indication message which is received by the terminal and is sent by the access point device may further carry: information of time for sending the third indication message by the access point device to the terminal, and correspondingly the terminal may enter a doze state after sending the second indication message to the access point device. The terminal may enter an awake state from the doze state before receiving the third indication message sent by the access point device.

In the method for sending uplink data according to this embodiment, after a terminal receives an indication message which is sent by an access point device and is used to indicate that the terminal is allowed to send uplink data, if the terminal needs to send uplink data, the terminal sends, to the access point device and according to the indication message for sending uplink data, an indication message which is used to indicate that uplink data is to be sent, so that after receiving the indication message which is used to indicate that uplink data is to be sent, the access point device sends, to the terminal, channel use time information for sending the uplink data, so as to improve utilization of uplink data sending time allocated by the access point device.

Figure 3:
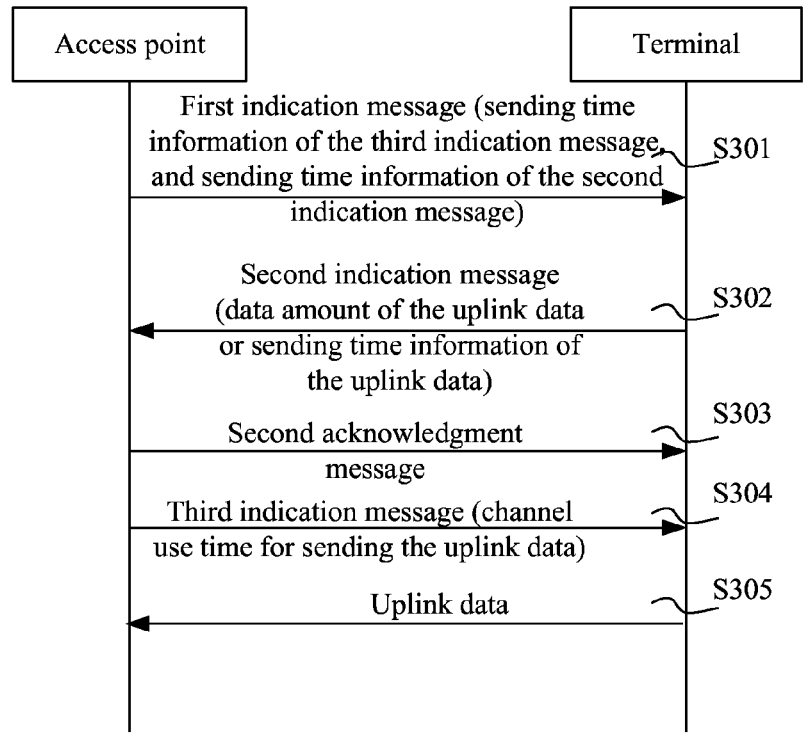
FIG. 3 is a flowchart of another embodiment of a method for sending uplink data according to the present invention.

FIG. 3 is a flowchart of another embodiment of a method for sending uplink data according to the present invention. As shown in FIG. 3, this embodiment provides a specific embodiment in which an access point device allocates channel use time for sending uplink data to each terminal in an implementation scenario where the access point device is an AP and a terminal is a STA. The method includes:

S301: The AP sends a beacon frame (Beacon) to the STA, where the beacon frame includes indication information used to indicate that the STA is allowed to access a current channel, or the beacon frame includes indication information used to indicate that the STA has downlink data on the AP, or the beacon frame includes indication information used to indicate that the STA is allowed to send uplink data.

The STA is a terminal, and the beacon frame Beacon is a first indication message. The AP may indicate or page, through a page indication element (Page Indication MAP, PIM element) in the Beacon, the STA that is allowed to send uplink data. The PIM element may be indicated by multiple binary bits, and each binary bit may correspond to one station STA. For example, a position sequence number of each binary bit in the whole PIM element may be an association identifier (Association Identifier, AID) of a corresponding STA. A corresponding binary bit in the PIM element may be set to "1" to indicate that a STA at a corresponding position is allowed to send uplink data, or indicate that a STA at a corresponding position is allowed to access the current channel, or indicate to a STA at a corresponding position that the AP has downlink data of the STA.

When there are many STAs served by the AP, in order to avoid a conflict generated because multiple STAs send the second indication message (which may, for example, be an uplink data sending indication/request message (Uplink Poll, UL-Poll)) in a channel contention manner, alternatively, the AP may allocate time for sending the UL-Poll to each STA, and carry sending time information for sending the UL-Poll by each STA in the first indication message, where the sending time information is time for sending the UL-Poll by each STA within a current beacon interval (Beacon Interval), so that each STA does not need to send the UL-Poll in a contention manner, but may send the UL-Poll to the AP at the time allocated by the AP.

It should be noted that in an embodiment of the present invention, in a case that the beacon frame includes indication information used to indicate that the STA has downlink data on the AP, when the STA receives the first indication message sent by the AP and finds that the STA itself has downlink data buffered on the AP, the STA may also include, in the indication message which is sent to the AP and indicates that the STA is prepared for receiving the downlink data at subsequent agreed time (for example, within the current Beacon interval), that the STA itself has uplink data to be sent and data amount information of the uplink data to be sent or sending time information required for sending the uplink data. In this case, the indication message which is sent by the STA to the AP and indicates that the STA is prepared for receiving the downlink data is the second indication message UL-Poll.

In one feasible implementation manner, the AP may directly carry, in the Beacon, sending time information for sending the UL-Poll by each STA, for example, the Beacon may directly carry an AID of each STA and corresponding information of time for sending the UL-Poll, namely, the AP may indicate, by using explicit information in the Beacon, the sending time information for sending the UL-Poll by each STA.

In another feasible implementation manner, the AP may further indicate, by using implicit information in the Beacon, the sending time information for sending the UL-Poll by each STA. In one implementation scenario, the PIM element may be indicated by multiple binary bits, and each binary bit may correspond to one STA. In an embodiment of the present invention, a position sequence number of each binary bit in the PIM element corresponds to the association identifier AID of the corresponding STA. The binary bits may correspondingly include all STAs that the AP allows to send uplink data, for example, a binary bit set to "1" in the PIM element may indicate that a corresponding STA is allowed to send uplink data, and the STA needs to send a second indication message if the STA has data to be sent; a binary bit set to "0" in the PIM element indicates that a corresponding STA is not allowed to send uplink data, and the corresponding STA does not need to send a second indication message. For a STA allowed to send uplink data, the AP and the STA may agree that certain time is used as a time unit. Each STA allowed to send uplink data may use a sequence number of its corresponding binary bit set to "1" among binary bits set to "1" in the whole PIM element as a time multiple, and use a same time unit multiplied by its corresponding time multiple to determine sending time for sending the UL-Poll.

A length of the sending time allocated by the AP to each STA for sending the UL-Poll may be determined according to factors such as the number of STAs paged in the PIM element and the time for sending the UL-Poll by each STA.

Alternatively, the Beacon may further carry: information of time for sending the third indication message sent by the AP to each STA, so that each STA may enter a doze state after sending the UL-Poll to the AP, and enter an awake state from the doze state before receiving the third indication message sent by the AP.

In one feasible implementation manner, the time for sending the third indication message by the AP to each STA may immediately follow the end of the time allocated by the AP to all paged STAs for sending the UL-Poll.

S302: The STA sends a UL-Poll message to the AP.

The UL-Poll message is a second indication message.

After receiving the Beacon, any STA may check whether a binary bit corresponding to the STA itself is set to "1" in the PIM element; and if the binary bit corresponding to the STA itself is set to "1" in the PIM element, it indicates that the AP allows the STA to send uplink data, or allows the STA to access the current channel, or the AP has downlink data of the STA.

Further, if the AP indicates, by using implicit information in the Beacon, the time for sending the UL-Poll by each STA, the STA may also use a default time unit multiplied by the corresponding time multiple to determine the time for sending the UL-Poll.

If any STA needs to send uplink data, the STA may send a UL-Poll message to the AP.

Alternatively, the STA may determine a data amount of the uplink data or sending time of the uplink data. The UL-Poll message sent by the terminal to the AP may carry the data amount of the uplink data or information of time for sending the uplink data, so that the AP can determine, according to the data amount of the uplink data or the information of time for sending the uplink data, where the data amount of the uplink data or the information of time for sending the uplink data is carried in the UL-Poll message, channel use time for sending the uplink data by each STA.

The UL-Poll may adopt a format shown in the following Table 1:

TABLE 1

| Frame Control | Duration | RA | TA | FCS |
| --- | --- | --- | --- | --- |

In Table 1, "Frame Control" includes frame type information, so that a UL-Poll frame is different from other frames, and a value of "Duration" is used to indicate time information required by the STA for sending the uplink data. Or, a corresponding position of "Duration" may also be set to "length" to indicate length information of the uplink data that needs to be sent by the STA. RA indicates a source STA, TA indicates a destination AP, and FCS indicates check information used for the UL-Poll message.

Alternatively, the STA may enter a doze (doze) state to save power after sending the UL-Poll message to the AP. Further, if the Beacon carries the information of time for sending the third indication message sent by the AP to the STA, the STA may enter an awake (awake) state before receiving the third indication message sent by the AP.

S303: The AP sends a second acknowledgment message for the second indication message to the STA.

Alternatively, after receiving the UL-Poll message sent by the STA, the AP may immediately send a second acknowledgment message to the STA, where the second acknowledgment message may be a short acknowledgment message (Acknowledge, ACK), to indicate that the UL-Poll message sent by the STA is received.

S304: The AP sends a PSPM broadcast frame to the STA, where the broadcast frame carries channel use time information for sending uplink data by the STA.

In one feasible implementation manner, after receiving the UL-Poll message sent by the STA, the AP may broadcast, to all STAs at specified time, a channel allocation indication frame (Power Save Multi Poll, PSMP) as a third indication message, and carry, in the PSMP frame, the channel use time allocated to each STA for sending uplink data. In this implementation scenario, the AP does not need to separately respond with an ACK acknowledgment message after receiving the UL-Poll message sent by each STA, but may broadcast a PSMP message after the channel use time allocated to each STA for sending uplink data.

The PSMP frame may adopt a format shown in the following Table 2:

TABLE 2

| Order | Information |
| --- | --- |
| 1 | Category |
| 2 | HT Action |
| 3 | PSMP parameter Set |

TABLE 2-continued

| Order | Information |
| --- | --- |
| 4 to (N_STA + 3) | PSMP STA Info Repeated N_STA times (N_STA is a subfield of the PSMP parameter Set field) |

Category indicates a frame type, HT Action indicates that the PSMP frame is a control frame used for high-speed transmission, PSMP parameter Set indicates a set of parameters of the PSMP, and PSMP STA Info indicates a channel use time information element which is included in the frame and is specified for the STA, where the information element may include different channel use time formats, and time formats are distinguished through STA-INFO TYPE. Repeated N_STA times (N_STA is a subfield of the PSMP parameter Set field) indicates: Multiple PSMP STA Info information elements may be included in the PSMP frame when it is needed to specify channel use time for multiple STAs simultaneously.

For each STA, the PSMP message may include fields shown in the following Table 3:

TABLE 3

| STA_INFO TYPE(=3) | STA_ID | PIM-UTT Start offset | PIM-UTT Duration | Reserved |
| --- | --- | --- | --- | --- |

STA-INFO indicates a STA-INFO element in the PSMP, where a type of the element may be set to "type 3" (TYPE=3), STAID indicates an identifier of the STA, PIM-UTT Start offset indicates start time allocated to the STA for sending uplink data, and PIM-UTT Duration indicates the duration allocated to the STA for sending uplink data.

Figure 4:
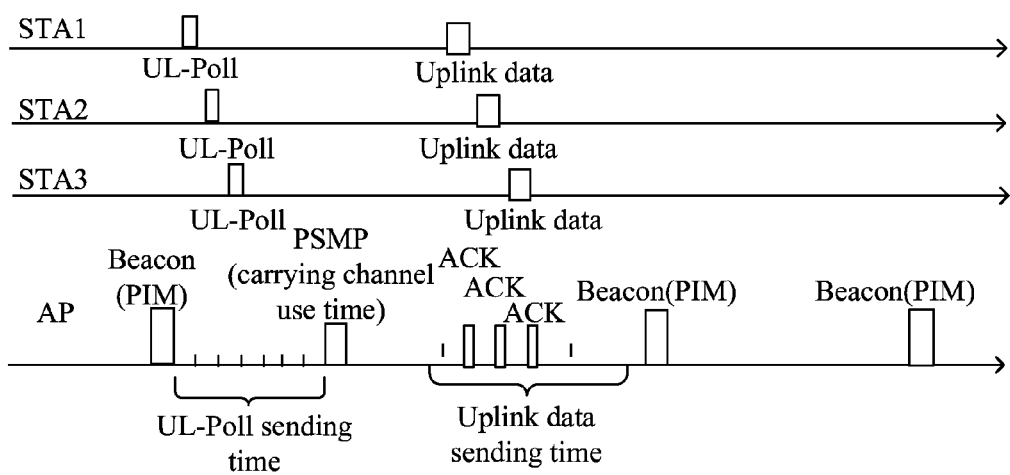
FIG. 4 is a schematic diagram of an embodiment in which an AP uses a PSMP broadcast frame to complete uplink data transmission to a STA1, a STA2, and a STA3 of STAs according to the present invention.

FIG. 4 is a schematic diagram in which an AP allocates uplink data sending time to a STA1, a STA2, and a 3 to complete uplink data sending. The AP periodically broadcasts a Beacon frame carrying a PIM element, namely, a first indication message. After receiving the first indication message, the STA1, the STA2, and the STA3 separately send a UL-Poll, namely, a second indication message, to the AP. After receiving the UL-Poll separately sent by the STA1, the STA2, and the STA3, the AP sends a PSMP broadcast frame carrying channel use time for sending uplink data by the STA1, the STA2, and the STA3; the STA1, S the TA2, and the STA3 may send uplink data to the AP at their respective corresponding channel use time after receiving the PSMP broadcast frame.

Figure 5:
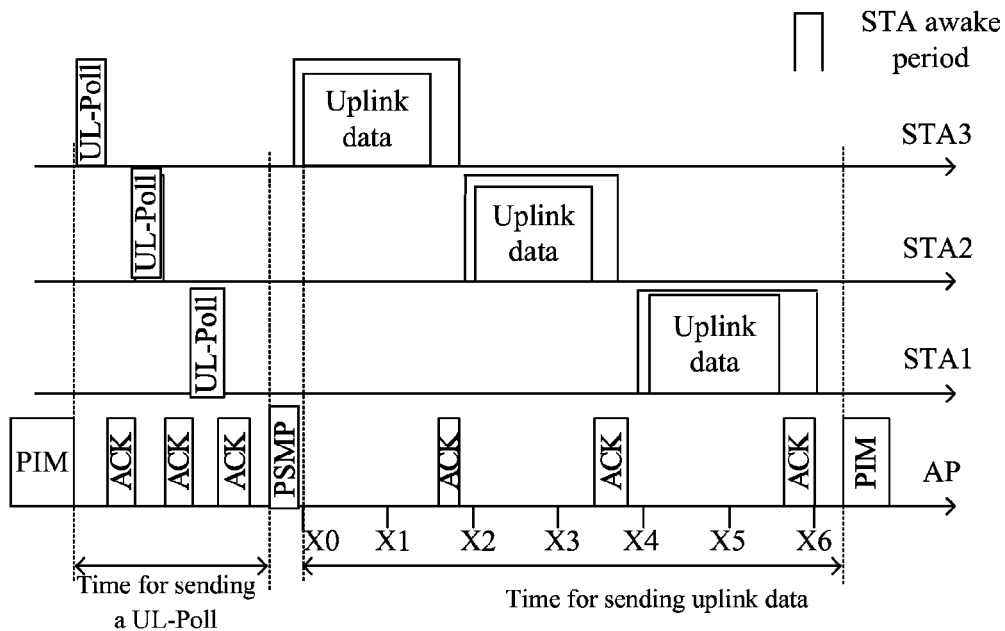
FIG. 5 is a schematic diagram of another embodiment in which an AP uses a PSMP broadcast frame to complete uplink data transmission to a STA1, a STA2, and a STA3 of STAs according to the present invention.

As shown in FIG. 5, the AP may send an acknowledgment message (second acknowledgment message) ACK for the UL-Poll message separately to the STA1, the STA2, and the STA3 after receiving the UL-Poll message (second indication message) sent by the STA1, the STA2, and the STA3, where the second acknowledgment message is used to indicate that the AP has received the UL-Poll. After receiving the UL-Poll message (second indication message) sent by the STA1, the STA2, and the 3, the AP may send, to these STAs, a PSMP broadcast frame carrying the channel use time for sending uplink data by the STA1, the STA2, and the STA3; the STA1, the STA2, and the STA3 may send uplink data to the AP at their respective corresponding channel use time after receiving the PSMP broadcast frame.

Figure 6:
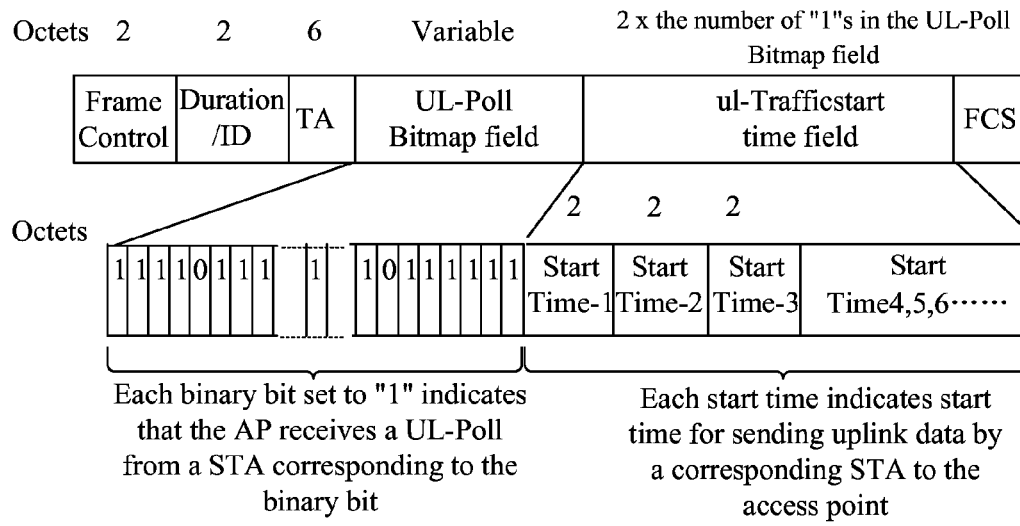
FIG. 6 is a schematic structural diagram of a MAC frame according to the present invention.

In another feasible implementation manner, in addition to the PSMP frame, the AP may also use a broadcast frame of another type. For example, as shown in FIG. 6, a newly defined media access control frame (Media Access Control, MAC frame) may be used as a third indication message. In addition to existing frame control (Frame control), existing frame sending duration (Duration/ID), and an existing check bit (FCS) field, two new fields may be further defined: a UL-Poll bitmap field (UL-Poll Bitmap field) and an uplink data transmission time field (UL Traffic Time field). The UL-Poll Bitmap field may include multiple binary bits, and each binary bit may correspond to one STA. For a specific corresponding rule, reference may be made to a definition of the PIM element in the Beacon, for example, a binary bit set to "1" may indicate that the AP correctly receives a UL-Poll message from a STA which uses a position sequence number of the binary bit in the UL-Poll Bitmap field as an AID. The UL Traffic Time field may also include multiple binary octets, each octet includes 8 binary bits, and every two octets indicate start time for sending uplink data by the STA, where sending of the uplink data ends before next start time. In addition, after the two octets that indicate the start time for sending uplink data by each STA, one or more octets may be used to further indicate a duration which is used for sending uplink data and corresponds to the start time.

In another feasible implementation manner, after receiving the UL-Poll message sent by the STA, the AP may send a first acknowledgment message for the UL-Poll message to the STA, and carry, in the first acknowledgment message, channel use time information allocated to the STA for sending uplink data.

Figure 7:
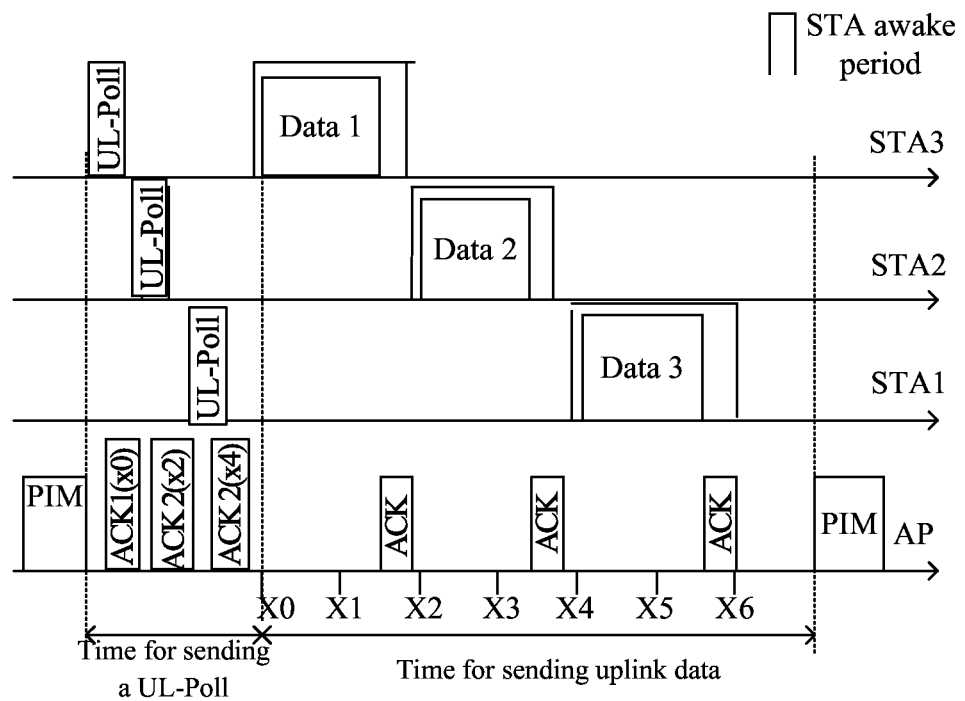
FIG. 7 is a schematic diagram in which an AP separately sends a second acknowledgment message to a STA1, a STA2, and a STA3 of STAs to complete uplink data transmission according to the present invention.

FIG. 7 is a schematic diagram in which an AP separately sends a second acknowledgment message to a STA1, a STA2, and a STA3 to complete uplink data transmission. The AP periodically broadcasts a Beacon carrying a PIM element, namely, a first indication message. After receiving the first indication message, the STA1, the STA2, and the STA3 separately send a UL-Poll message, namely, a second indication message, to the AP. After receiving the UL-Poll sent by the STA1, the STA2, or the STA3, the AP separately sends first acknowledgment messages ACK1 (x0), ACK2 (x2), and ACK3 (x4) for the UL-Poll message immediately after each UL-Poll message to the STA1, the STA2, and the STA3, where the ACK1 (x0) may carry channel use start time for sending uplink data by the STA1, for example, x0 ; the ACK2 (x2) may carry channel use start time for sending uplink data by the STA2, for example, x2; and the ACK3(x4) may carry channel use start time for sending uplink data by the STA3, for example, x4. The STA1, the STA2, and the STA3 may send uplink data to the AP at their respective corresponding channel use time.

S305: The STA sends the uplink data to the AP at the channel use time carried in the third indication message.

In the method for sending uplink data according to this embodiment, an AP instructs, through a Beacon frame, a STA to send uplink data, but the STA may not correctly receive the Beacon frame from the AP due to a reason of nearby co-channel radio signal interference, and therefore the STA cannot send a UL-Poll to the AP, or the STA may send a UL-Poll to the AP but the AP does not correctly receive the UL-Poll, or the STA does not need to send uplink data to the AP. In the foregoing implementation scenarios, the AP does not allocate channel use time for sending uplink data to the STA subsequently, and allocates channel use time for sending uplink data to the STA only when the AP receives an indication message which is sent by the STA and indicates that uplink data is to be sent, and broadcast, at specified time, the channel use time allocated to each STA for sending uplink data, so as to improve utilization of uplink data sending time allocated by the access point device.

Figure 8:
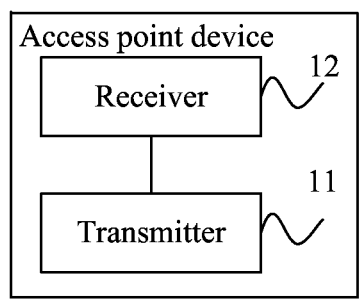
FIG. 8 is a schematic structural diagram of an embodiment of an access point device according to the present invention.

FIG. 8 is a schematic structural diagram of an embodiment of an access point device according to the present invention. As shown in FIG. 8, the access point device includes a transmitter 11 and a receiver 12.

The transmitter 11 is configured to send a first indication message to a terminal, where the first indication message is used to indicate that the terminal is allowed to access a current channel, or the first indication message is used to indicate that the terminal has downlink data on the access point device, or the first indication message is used to indicate that the terminal is allowed to send uplink data.

The receiver 12 is configured to receive a second indication message sent by the terminal according to the first indication message, where the second indication message is used to indicate that the terminal is to send uplink data.

The transmitter 11 is further configured to send a third indication message to the terminal after the receiver 12 receives the second indication message, where the third indication message carries channel use time information, and the channel use time information is used to indicate time for using the channel to send the uplink data by the terminal.

Figure 9:
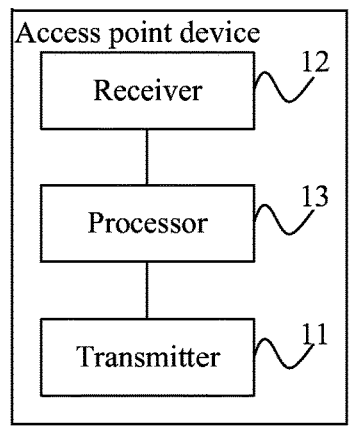
FIG. 9 is a schematic structural diagram of another embodiment of an access point device according to the present invention.

FIG. 9 is a schematic structural diagram of another embodiment of an access point device according to the present invention. As shown in FIG. 9, the access point device includes a transmitter 11, a receiver 12, and a processor 13.

Alternatively, a second indication message received by the receiver 12 carries a data amount of uplink data of a terminal or information of time for sending the uplink data.

Correspondingly, the processor 13 may be configured to determine channel use time information according to the data amount of the uplink data or the information of time for sending the uplink data, where the data amount of the uplink data or the information of time for sending the uplink data is carried in the second indication message.

Alternatively, the transmitter 11 may be specifically configured to: send a broadcast message to the terminal, where the broadcast message carries channel use time information; or send a first acknowledgment message for the second indication message to the terminal, where the first acknowledgment message carries channel use time information.

Alternatively, the transmitter 11 is further configured to send a second acknowledgment message for the second indication message to the terminal after the receiver 12 receives the second indication message sent by the terminal, where the second acknowledgment message is used to indicate that the access point device has received the second indication message.

Alternatively, a first indication message sent by the transmitter 11 further carries: information of time for sending the second indication message, where the information of time for sending the second indication message is used to indicate time for sending the second indication message by the terminal.

Alternatively, the first indication message sent by the transmitter 11 further carries: information of time for sending a third indication message by the transmitter 11 to the terminal, so that the terminal enters a doze state after sending the second indication message to the access point device, and enters an awake state from the doze state before receiving the third indication message sent by the transmitter 11.

The access point device provided by this embodiment of the present invention corresponds to the method for sending uplink data according to the embodiment of the present invention, and is a device for executing the method for sending uplink data. For a specific process of executing the method for sending uplink data, reference may be made to the method embodiments shown in FIG. 1, and FIG. 3 to FIG. 7, and details are not repeatedly described here.

After the access point device provided in this embodiment sends, to a terminal, an indication message that is used to indicate that the terminal is allowed to send uplink data, if the access point device receives an indication message which is sent by the terminal according to the indication message for sending uplink data and is used to indicate that uplink data is to be sent, the access point device sends, to the terminal, channel use time information for sending the uplink data, so as to improve utilization of uplink data sending time allocated by the access point device.

Figure 10:
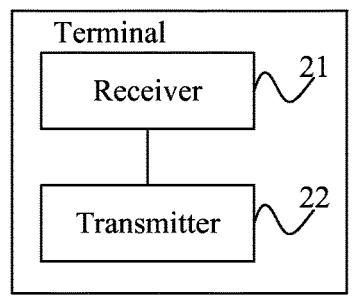
FIG. 10 is a schematic structural diagram of an embodiment of a terminal according to the present invention.

FIG. 10 is a schematic structural diagram of an embodiment of a terminal according to the present invention. As shown in FIG. 10, the terminal includes: a receiver 21 and a transmitter 22.

The receiver 21 is configured to receive a first indication message sent by an access point device, where the first indication message is used to indicate that the terminal is allowed to access a current channel, or the first indication message is used to indicate that the terminal has downlink data on the access point device, or the first indication message is used to indicate that the terminal is allowed to send uplink data.

The transmitter 22 is configured to send a second indication message to the access point device according to the first indication message, where the second indication message is used to indicate that the terminal is to send uplink data.

The receiver 21 is further configured to receive a third indication message sent by the access point device after the access point device receives the second indication message, where the third indication message carries channel use time information, and the channel use time information is used to indicate time for using the channel to send the uplink data by the terminal.

The transmitter 22 is further configured to send the uplink data to the access point device at the time for using the channel according to the channel use time information.

Figure 11:
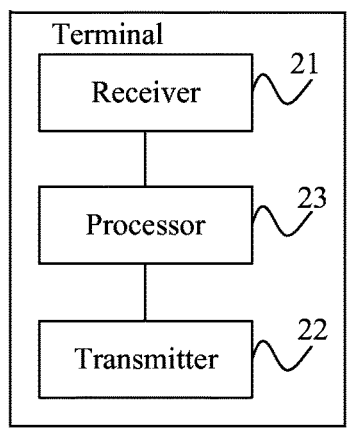
FIG. 11 is a schematic structural diagram of another embodiment of a terminal according to the present invention.

FIG. 11 is a schematic structural diagram of another embodiment of a terminal according to the present invention. As shown in FIG. 11, the terminal includes: a receiver 21, a transmitter 22, and a processor 23.

The processor 23 is configured to determine a data amount of uplink data or information of time for sending uplink data.

Correspondingly, a second indication message sent by the transmitter 22 to an access point device carries the data amount of the uplink data or the information of time for sending the uplink data, so that the access point device determines channel use time information according to the data amount of the uplink data or the information of time for sending the uplink data.

Alternatively, a third indication message is specifically a broadcast message sent by the access point device, where the broadcast message carries channel use time information; and the receiver 21 may be specifically configured to: receive the broadcast message sent by the access point device. Or, a third indication message is specifically a first acknowledgment message sent by the access point device for the second indication message, where the first acknowledgment message carries channel use time information; and the receiver 21 is specifically configured to: receive the first acknowledgment message sent by the access point device.

Alternatively, the receiver 21 may be further configured to: receive a second acknowledgment message sent by the access point device for the second indication message, where the second acknowledgment message is used to indicate that the access point device has received the second indication message.

Alternatively, a first indication message received by the receiver 21 further carries: information of time for sending the second indication message, where the information of time for sending the second indication message is used to indicate time for sending the second indication message by the terminal.

Correspondingly, the transmitter 22 may be specifically configured to: send the second indication message to the access point device according to the information of time for sending the second indication message, where the information of time for sending the second indication message is carried in the first indication message.

Alternatively, the first indication message further carries: information of time for sending the third indication message by the access point device to the terminal; the processor 23 may be further configured to control the terminal to enter a doze state after the transmitter 22 sends the second indication message to the access point device; and the processor 23 may be further configured to control the terminal to enter an awake state from the doze state before the receiver 21 receives the third indication message.

The terminal provided by this embodiment of the present invention corresponds to the method for sending uplink data according to the embodiment of the present invention, and is a device for executing the method for sending uplink data. For a specific process of executing the method for sending uplink data, reference may be made to the method embodiments shown in FIG. 2 to FIG. 7, and details are not repeatedly described here.

After the terminal provided by this embodiment receives an indication message which is sent by the access point device and is used to indicate that the terminal is allowed to send uplink data, if the terminal needs to send uplink data, the terminal sends, to the access point device and according to the indication message for sending uplink data, an indication message which is used to indicate that uplink data is to be sent, so that after receiving the indication message which is used to indicate that uplink data is to be sent, the access point device sends, to the terminal, channel use time information for sending uplink data, so as to improve utilization of uplink data sending time allocated by the access point device.

Persons skilled in the art may clearly understood that, for the purpose of convenient and brief description, dividing of the foregoing functional modules is merely taken as an example for description. In practical applications, the foregoing functions may be assigned to different functional modules for implementation as required. That is, an internal structure of an apparatus is divided into different functional modules to implement all or part of the foregoing described functions. For a specific working process of the foregoing system, apparatus, and unit, reference may be made to a corresponding process in the foregoing method embodiments, and details are not repeatedly described here.

In the several embodiments provided in the present application, it should be understood that the disclosed system, apparatus, and method may be implemented in other manners. For example, the foregoing described apparatus embodiments are merely exemplary. For example, dividing of the modules or units is merely a kind of logical function dividing, and there may be other dividing manners during actual implementation. For example, a plurality of units or components may be combined or integrated into another system, or some features may be ignored or not performed. In addition, the shown or discussed mutual couplings or direct couplings or communication connections may be implemented through some interfaces. Indirect couplings or communication connections between apparatuses or units may be electronic, mechanical or in other forms.

The units described as separate components may or may not be physically separated; and the components shown as units may or may not be physical units, namely, may be located in one place, or may also be distributed on multiple network units. Part or all of the units may be selected according to an actual need to achieve the objectives of the solutions of the embodiments.

In addition, functional units in the embodiments of the present application may be integrated into one processing unit, each of the units may also exist alone physically, and two or more than two units may also be integrated into one unit. The integrated unit may be implemented in a form of hardware, and may also be implemented in a form of a software functional unit.

When the integrated unit are implemented in the form of a software functional unit and sold or used as an independent product, the integrated unit may be stored in a computer readable storage medium. Based on such understanding, the technical solutions of the present application essentially, or the part contributing to the prior art, or all or part of the technical solutions may be implemented in a form of a software product. The computer software product is stored in a storage medium and includes several instructions for enabling a computer device (which may be a personal computer, a server, or a network device, or the like) or a processor (processor) to perform all or part of the steps of the methods described in the embodiments of the present application. The storage medium includes: any medium that is capable of storing program codes, such as a U disk, a removable hard disk, a read-only memory (ROM, Read-Only Memory), a random access memory (RAM, Random Access Memory), a magnetic disk, or an optical disk.

It should be noted that the foregoing embodiments are merely intended for describing the technical solutions of the present application rather than limiting the present invention. Although the present application is described in detail with reference to the foregoing embodiments, persons of ordinary skill in the art should understand that they may still make modifications to the technical solutions described in the embodiments, or make equivalent replacements to part of the technical features in the technical solutions described in the embodiments; however, these modifications or replacements do not make the essence of the corresponding technical solutions depart from the spirit and scope of the technical solutions of the embodiments of the present application.

What is claimed is:

1. A method for notifying channel use time for sending uplink data, the method comprising:
   sending, by an access point device, a first indication message to a terminal, wherein the first indication message comprises a binary bit associated with the terminal and a sequence number, and wherein, when the binary bit is set to 1, the terminal is allowed to access a current working channel of the access point device;
   receiving, by the access point device, a second indication message sent by the terminal according to a transmission time, wherein the transmission time is a product of a predetermined time unit and the sequence number of the binary bit associated with the terminal when the binary bit is set to 1, wherein the second indication message is used to indicate that the terminal is to send uplink data; and after receiving the second indication message, sending, by the access point device, a third indication message to the terminal, wherein the third indication message carries channel use time information, and the channel use time information is used to indicate time for using the current working channel of the access point device to send the uplink data by the terminal; wherein the third indication message comprises an uplink traffic time field including multiple binary octets, wherein each binary octet of the multiple binary octets includes eight binary bits, wherein every two octets of the multiple binary octets indicate a start time for sending the uplink data, and wherein sending of the uplink data ends before next start time.

2. The method according to claim 1, wherein the second indication message carries a data amount of the uplink data of the terminal or information of time for sending the uplink data of the terminal.

3. The method according to claim 2, wherein before sending, the third indication message to the terminal, the method further comprises determining, by the access point device, the channel use time information according to the data amount of the uplink data or the information of time for sending the uplink data.

4. The method according to claim 1, wherein sending, the third indication message to the terminal comprises:
sending, by the access point device, a broadcast message to the terminal, wherein the broadcast message carries the channel use time information; or
sending, by the access point device, a first acknowledgment message for the second indication message to the terminal, wherein the first acknowledgment message carries the channel use time information.

5. The method according to claim 1, wherein after receiving, the second indication message, the method further comprises:
sending, by the access point device, a second acknowledgment message for the second indication message to the terminal, wherein the second acknowledgment message is used to indicate that the access point device has received the second indication message.

6. The method according to claim 1, wherein the first indication message further carries information related to a time for sending the third indication message by the access point device to the terminal, so that the terminal enters a doze state after sending the second indication message to the access point device, and enters an awake state from the doze state before receiving the third indication message sent by the access point device.

7. A method for sending uplink data, the method comprising:
receiving, by a terminal, a first indication message sent by an access point device, wherein the first indication message comprises a binary bit associated with the terminal and a sequence number, and wherein when the binary bit is set to 1, the terminal is allowed to access a current working channel of the access point device;
sending, by the terminal, a second indication message to the access point device according to transmission time, wherein the transmission time is a product of a predetermined time unit and the sequence number of the binary bit associated with the terminal when the binary bit is set to 1, wherein the second indication message is used to indicate that the terminal is to send uplink data;
receiving, by the terminal, a third indication message sent by the access point device, wherein the third indication message carries channel use time information, the channel use time information being used to indicate time for using the current working channel of the access point device to send the uplink data by the terminal, wherein the third indication message comprises an uplink traffic time field including multiple binary octets, wherein each binary octet of the multiple binary octets includes eight binary bits, wherein every two octets of the multiple binary octets indicate a start time for sending the uplink data, and wherein sending of the uplink data ends before next start time; and
sending, by the terminal, the uplink data to the access point device according to the channel use time information.

8. The method according to claim 7, wherein before sending the second indication message to the access point device, the method further comprises determining, by the terminal, a data amount of the uplink data or information of time for sending the uplink data; and
wherein the second indication message sent by the terminal to the access point device carries the data amount of the uplink data or the information of time for sending the uplink data, so that the access point device determines the channel use time information according to the data amount of the uplink data or the information of time for sending the uplink data.

9. The method according to claim 7, wherein the third indication message is a broadcast message sent by the access point device, the broadcast message carrying the channel use time information; or
wherein the third indication message is a first acknowledgment message sent by the access point device for the second indication message, the first acknowledgment message carrying the channel use time information.

10. The method according to claim 7, wherein after sending, the second indication message to the access point device, the method further comprises:
receiving, by the terminal, a second acknowledgment message sent by the access point device for the second indication message, wherein the second acknowledgment message is used to indicate that the access point device has received the second indication message.

11. The method according to claim 7, wherein the first indication message further carries information related to a time for sending the third indication message by the access point device to the terminal;
wherein after sending, the second indication message to the access point device, the method further comprise entering, by the terminal, a doze state; and
wherein before receiving, the third indication message sent by the access point device, the method further comprises entering, by the terminal, an awake state from the doze state.

12. An access point device, comprising:
a transmitter, configured to send a first indication message to a terminal, wherein the first indication message comprises a binary bit associated with the terminal and a sequence number, and wherein when the binary bit is set to 1, the terminal is allowed to access a current working channel of the access point device; and
a receiver, configured to receive a second indication message sent by the terminal according to transmission time, wherein the transmission time is a product of a predetermined time unit and the sequence number of the binary bit associated with the terminal when the binary bit is set to 1, wherein the second indication message is used to indicate that the terminal is to send uplink data;

wherein the transmitter is further configured to send a third indication message to the terminal after the receiver receives the second indication message, wherein the third indication message carries channel use time information, the channel use time information being used to indicate time for using the current working channel of the access point device to send the uplink data by the terminal; wherein the third indication message comprises an uplink traffic time field including multiple binary octets, wherein each binary octet of the multiple binary octets includes eight binary bits, wherein every two octets of the multiple binary octets indicate a start time for sending the uplink data, and wherein sending of the uplink data ends before next start time.

13. The access point device according to claim 12, wherein the second indication message received by the receiver carries a data amount of the uplink data of the terminal or information of time for sending the uplink data of the terminal.

14. The access point device according to claim 13, further comprising:
a processor, configured to determine the channel use time information according to the data amount of the uplink data or the information of time for sending the uplink data.

15. The access point device according to claim 12, wherein the transmitter is specifically configured to send a broadcast message to the terminal, wherein the broadcast message carries the channel use time information; or
to send a first acknowledgment message for the second indication message to the terminal, wherein the first acknowledgment message carries the channel use time information.

16. The access point device according to claim 12, wherein the transmitter is further configured to send a second acknowledgment message for the second indication message to the terminal after the receiver receives the second indication message sent by the terminal, wherein the second acknowledgment message is used to indicate that the access point device has received the second indication message.

17. The access point device according to claim 12, wherein the first indication message sent by the transmitter further carries information related to a time for sending the third indication message by the transmitter to the terminal, so that the terminal enters a doze state after sending the second indication message to the access point device, and enters an awake state from the doze state before receiving the third indication message sent by the transmitter.

18. A terminal, comprising:
a receiver, configured to receive a first indication message sent by an access point device, wherein the first indication message comprises a binary bit associated with the terminal and a sequence number, and wherein when the binary bit is set to 1, the terminal is allowed to access a current working channel of the access point device; and
a transmitter, configured to send a second indication message to the access point device according to transmission time, wherein the transmission time is a product of a predetermined time unit and the sequence number of the binary bit associated with the terminal when the binary bit is set to 1, wherein the second indication message is used to indicate that the terminal is to send uplink data;

wherein the receiver is further configured to receive a third indication message sent by the access point device, wherein the third indication message carries channel use time information, the channel use time information being used to indicate time for using the current working channel of the access point device to send the uplink data by the terminal, wherein the third indication message comprises an uplink traffic time field including multiple binary octets, wherein each binary octet of the multiple binary octets includes eight binary bits, wherein every two octets of the multiple binary octets indicate a start time for sending the uplink data, and wherein sending of the uplink data ends before next start time; and wherein the transmitter is further configured to send the uplink data to the access point device according to the channel use time information.

19. The terminal according to claim 18, further comprising:
a processor, configured to determine a data amount of the uplink data or information of time for sending the uplink data;
wherein the second indication message sent by the transmitter to the access point device carries the data amount of the uplink data or the information of time for sending the uplink data, so that the access point device determines the channel use time information according to the data amount of the uplink data or the information of time for sending the uplink data.

20. The terminal according to claim 18, wherein the third indication message is a broadcast message sent by the access point device, the broadcast message carrying the channel use time information, and wherein the receiver is configured to receive the broadcast message sent by the access point device; or
wherein the third indication message is a first acknowledgment message sent by the access point device for the second indication message, the first acknowledgment message carrying the channel use time information and wherein the receiver is specifically configured to receive the first acknowledgment message sent by the access point device.

21. The terminal according to claim 18, wherein the receiver is further configured to receive a second acknowledgment message sent by the access point device for the second indication message, the second acknowledgment message being used to indicate that the access point device has received the second indication message.

22. The terminal according to claim 18, wherein the first indication message further carries information of time for sending the third indication message by the access point device to the terminal, the terminal comprising a processor configured to control the terminal to enter a doze state after the transmitter sends the second indication message to the access point device, wherein the processor is further configured to control the terminal to enter an awake state from the doze state before the receiver receives the third indication message.

* * * * *